(12) United States Patent
Kaledin et al.

(10) Patent No.: US 9,309,131 B2
(45) Date of Patent: Apr. 12, 2016

(54) ALUMINIZED SILICIOUS POWDER AND WATER PURIFICATION DEVICE INCORPORATING SAME

(71) Applicant: Argonide Corporation, Sanford, FL (US)

(72) Inventors: Leonid A. Kaledin, Port Orange, FL (US); Frederick Tepper, Sanford, FL (US); Tatiana G. Kaledin, Port Orange, FL (US)

(73) Assignee: Argonide Corporation, Sanford, FL (US)

( * ) Notice: Subject to any disclaimer, the term of this patent is extended or adjusted under 35 U.S.C. 154(b) by 0 days.

(21) Appl. No.: 13/914,092

(22) Filed: Jun. 10, 2013

(65) Prior Publication Data

US 2014/0001123 A1    Jan. 2, 2014

Related U.S. Application Data

(60) Provisional application No. 61/665,099, filed on Jun. 27, 2012.

(51) Int. Cl.
| | |
|---|---|
| *B01J 20/00* | (2006.01) |
| *B01D 39/00* | (2006.01) |
| *C01F 1/00* | (2006.01) |
| *C01F 3/00* | (2006.01) |
| *C01F 7/00* | (2006.01) |
| *C01G 15/00* | (2006.01) |
| *C22B 21/00* | (2006.01) |
| *C22B 35/00* | (2006.01) |
| *C22B 58/00* | (2006.01) |
| *C22B 61/00* | (2006.01) |
| *C02F 1/28* | (2006.01) |
| *B01J 20/08* | (2006.01) |
| *B01J 20/10* | (2006.01) |
| *B01J 20/14* | (2006.01) |
| *B01J 20/28* | (2006.01) |
| *B01J 20/30* | (2006.01) |
| *B01J 20/32* | (2006.01) |
| *C02F 1/00* | (2006.01) |
| *C02F 1/38* | (2006.01) |
| *C02F 1/44* | (2006.01) |
| *C02F 1/68* | (2006.01) |
| *C02F 101/00* | (2006.01) |
| *C02F 101/10* | (2006.01) |
| *C02F 101/20* | (2006.01) |
| *C02F 101/30* | (2006.01) |
| *C02F 103/10* | (2006.01) |
| *C02F 103/34* | (2006.01) |

(52) U.S. Cl.
CPC .............. *C02F 1/281* (2013.01); *B01J 20/08* (2013.01); *B01J 20/10* (2013.01); *B01J 20/106* (2013.01); *B01J 20/14* (2013.01); *B01J 20/28033* (2013.01); *B01J 20/3085* (2013.01); *B01J 20/3204* (2013.01); *B01J 20/3236* (2013.01); *C02F 1/288* (2013.01); *C02F 1/004* (2013.01); *C02F 1/38* (2013.01); *C02F 1/385* (2013.01); *C02F 1/44* (2013.01); *C02F 1/681* (2013.01); *C02F 2001/007* (2013.01); *C02F 2101/006* (2013.01); *C02F 2101/103* (2013.01); *C02F 2101/20* (2013.01); *C02F 2101/308* (2013.01); *C02F 2103/10* (2013.01); *C02F 2103/343* (2013.01); *C02F 2303/04* (2013.01); *C02F 2303/18* (2013.01)

(58) Field of Classification Search
None
See application file for complete search history.

(56) References Cited

U.S. PATENT DOCUMENTS

| | | | |
|---|---|---|---|
| 2,036,258 A * | 4/1936 | Cummins | B01J 20/041 210/500.1 |
| 2,773,601 A | 12/1956 | Keller et al. | |
| 2,783,894 A | 3/1957 | Lovell et al. | |
| 2,915,475 A | 12/1959 | Bugosh | |
| 2,917,426 A | 12/1959 | Bugosh | |
| 3,025,233 A | 3/1962 | Figert | |
| 3,031,417 A | 4/1962 | Bruce | |
| 3,031,418 A | 4/1962 | Bugosh | |
| 3,056,747 A | 10/1962 | Arthur, Jr. | |
| 3,117,944 A | 1/1964 | Harrell | |
| 3,234,075 A | 2/1966 | Braitberg | |
| 3,242,073 A | 3/1966 | Guebert et al. | |

(Continued)

FOREIGN PATENT DOCUMENTS

| | | |
|---|---|---|
| DE | 2410215 | 9/1974 |
| DE | 2510467 | 9/1976 |

(Continued)

OTHER PUBLICATIONS

Truesdail et al (Analysis of Bacterial Deposition on Metal (Hydr)oxide-Coated Sand Filter Media, J Colloid and Interface Sci, 203, (1998) pp. 369-378).*

(Continued)

*Primary Examiner* — Melvin C Mayes
*Assistant Examiner* — Michael Forrest
(74) *Attorney, Agent, or Firm* — Alicia M. Passerin, Esq.; Pietragallo Gordon Alfano Bosick & Raspanti, LLP

(57) ABSTRACT

A reaction product of silicious material, aluminum metal, and an aqueous solution is disclosed. The reaction product may be used to form a sorbent that is used to purify water of contaminants such as biological matter, dyes, soluble metals, arsenic, or radioactive elements. Additives may be added to the reaction product to further improve the sorption qualities of the sorbent. Water purification devices having the sorbent are also disclosed.

15 Claims, 6 Drawing Sheets

(56) References Cited

U.S. PATENT DOCUMENTS

| | | | |
|---|---|---|---|
| 3,352,424 A | 11/1967 | Guebert et al. |
| 3,408,315 A | 10/1968 | Paine |
| 3,793,061 A | 2/1974 | Hammel et al. |
| 3,852,202 A | 12/1974 | Wells et al. |
| 3,947,562 A | 3/1976 | Grimshaw et al. |
| 4,007,113 A | 2/1977 | Ostreicher |
| 4,007,114 A | 2/1977 | Ostreicher |
| 4,059,119 A | 11/1977 | Grossman |
| 4,149,549 A | 4/1979 | Grossman |
| 4,153,661 A | 5/1979 | Ree et al. |
| 4,178,438 A | 12/1979 | Haase et al. |
| 4,230,573 A | 10/1980 | Kilty et al. |
| 4,242,226 A | 12/1980 | Siren |
| 4,282,261 A | 8/1981 | Greene |
| 4,288,462 A | 9/1981 | Hou et al. |
| 4,305,782 A | 12/1981 | Ostreicher et al. |
| 4,309,247 A | 1/1982 | Hou et al. |
| 4,321,288 A | 3/1982 | Ostreicher |
| 4,331,631 A | 5/1982 | Chapman et al. |
| 4,366,068 A | 12/1982 | Ostreicher et al. |
| 4,395,332 A | 7/1983 | Klein |
| 4,433,697 A | 2/1984 | Cline et al. |
| 4,455,187 A | 6/1984 | von Blucher et al. |
| 4,473,474 A | 9/1984 | Ostreicher et al. |
| 4,500,647 A | 2/1985 | Solomon |
| 4,510,193 A | 4/1985 | Blücher et al. |
| 4,511,473 A | 4/1985 | Hou |
| 4,523,995 A | 6/1985 | Pall et al. |
| 4,536,440 A | 8/1985 | Berg |
| 4,555,347 A | 11/1985 | O'Dowd et al. |
| 4,569,756 A | 2/1986 | Klein |
| 4,604,208 A | 8/1986 | Chu et al. |
| 4,606,823 A | 8/1986 | Lucas, III |
| 4,617,128 A | 10/1986 | Ostreicher |
| 4,664,683 A | 5/1987 | Degen et al. |
| 4,673,504 A | 6/1987 | Ostreicher et al. |
| 4,677,019 A | 6/1987 | von Blücher |
| 4,708,803 A | 11/1987 | Ostreicher et al. |
| 4,711,793 A | 12/1987 | Ostreicher et al. |
| 4,743,418 A | 5/1988 | Barnes, Jr. et al. |
| 4,761,323 A | 8/1988 | Mühlratzer et al. |
| 4,807,619 A | 2/1989 | Dyrud et al. |
| 4,824,451 A | 4/1989 | Vogt et al. |
| 5,085,784 A | 2/1992 | Ostreicher |
| 5,104,546 A | 4/1992 | Filson et al. |
| 5,109,311 A | 4/1992 | Hanazono et al. |
| 5,126,044 A | 6/1992 | Magnusson et al. |
| 5,147,722 A | 9/1992 | Koslow |
| 5,189,092 A | 2/1993 | Koslow |
| 5,219,577 A | 6/1993 | Kossovsky et al. |
| 5,225,078 A | 7/1993 | Polasky et al. |
| 5,307,796 A | 5/1994 | Kronzer et al. |
| 5,350,443 A | 9/1994 | von Blücher et al. |
| 5,366,636 A | 11/1994 | Marchin et al. |
| 5,486,292 A | 1/1996 | Bair et al. |
| 5,547,607 A | 8/1996 | Ando et al. |
| 5,562,824 A | 10/1996 | Magnusson |
| 5,611,832 A | 3/1997 | Suzuki et al. |
| 5,744,236 A | 4/1998 | Rohrbach et al. |
| 5,759,394 A | 6/1998 | Rohrbach et al. |
| 5,798,220 A | 8/1998 | Kossovsky |
| 5,800,706 A | 9/1998 | Fischer |
| 5,804,295 A | 9/1998 | Braun et al. |
| 5,855,788 A | 1/1999 | Everhart et al. |
| 5,865,968 A | 2/1999 | Denton et al. |
| 6,010,606 A | 1/2000 | Denton et al. |
| 6,057,488 A | 5/2000 | Koper et al. |
| 6,077,588 A | 6/2000 | Koslow et al. |
| 6,150,300 A | 11/2000 | Khare et al. |
| 6,155,432 A | 12/2000 | Wilson et al. |
| 6,197,515 B1 | 3/2001 | Bamdad et al. |
| 6,200,482 B1 | 3/2001 | Winchester et al. |
| 6,235,388 B1 | 5/2001 | Yamamoto et al. |
| 6,290,848 B1 | 9/2001 | Tanner et al. |
| 6,321,915 B1 | 11/2001 | Wilson et al. |
| 6,344,071 B1 | 2/2002 | Smith et al. |
| 6,355,330 B1 | 3/2002 | Koslow et al. |
| 6,402,819 B1 | 6/2002 | DeRuiter et al. |
| 6,420,293 B1 | 7/2002 | Change et al. |
| 6,464,757 B2 | 10/2002 | Zhang et al. |
| 6,514,413 B2 | 2/2003 | Pimenov et al. |
| 6,524,477 B1 | 2/2003 | Hughes |
| 6,550,622 B2 | 4/2003 | Koslow |
| 6,565,749 B1 | 5/2003 | Hou et al. |
| 6,630,016 B2 | 10/2003 | Koslow |
| 6,660,172 B2 | 12/2003 | Koslow |
| 6,716,218 B2 | 4/2004 | Holmes et al. |
| 6,716,525 B1 | 4/2004 | Yadav et al. |
| 6,797,167 B2 | 9/2004 | Koslow |
| 6,830,822 B2 | 12/2004 | Yadav |
| 6,838,005 B2 | 1/2005 | Tepper et al. |
| 6,849,109 B2 | 2/2005 | Yadav et al. |
| 6,872,311 B2 | 3/2005 | Koslow |
| 6,872,431 B2 | 3/2005 | Kahlbaugh et al. |
| 6,913,154 B2 | 7/2005 | Koslow |
| 6,953,604 B2 | 10/2005 | Koslow |
| 6,955,708 B1 | 10/2005 | Julos et al. |
| 6,959,820 B2 | 11/2005 | Koslow |
| 7,296,691 B2 | 11/2007 | Koslow |
| 7,311,752 B2 | 12/2007 | Tepper et al. |
| 7,390,343 B2 | 6/2008 | Tepper et al. |
| 7,445,718 B2 | 11/2008 | Misra et al. |
| 7,601,262 B1 | 10/2009 | Tepper et al. |
| 7,621,989 B2 | 11/2009 | Forslund |
| 7,708,958 B2 | 5/2010 | Namespetra et al. |
| 2001/0037972 A1 | 11/2001 | Quick et al. |
| 2003/0127393 A1 | 7/2003 | Tepper et al. |
| 2003/0177909 A1 | 9/2003 | Koslow |
| 2005/0011827 A1 | 1/2005 | Koslow |
| 2005/0029198 A1 | 2/2005 | Tepper et al. |
| 2006/0123991 A1 | 6/2006 | Braeunling et al. |
| 2006/0163174 A1 | 7/2006 | Namespetra et al. |
| 2006/0169144 A1 | 8/2006 | Forslund |
| 2006/0225574 A1 | 10/2006 | Braeunling et al. |
| 2007/0175196 A1* | 8/2007 | Tepper et al. .................. 55/527 |
| 2010/0038327 A1 | 2/2010 | Ma |
| 2011/0139726 A1* | 6/2011 | Jin et al. .................. 210/748.08 |

FOREIGN PATENT DOCUMENTS

| | | |
|---|---|---|
| EP | 0099586 | 2/1984 |
| EP | 0525631 | 3/1993 |
| EP | 0958851 | 11/1999 |
| EP | 1219335 | 7/2002 |
| GB | 2045828 | 11/1980 |
| WO | 98/02231 | 1/1998 |
| WO | 99/47456 | 9/1999 |
| WO | 03/000407 | 1/2003 |
| WO | 2008/064504 | 6/2008 |
| WO | 2011/016889 A2 | 2/2011 |

OTHER PUBLICATIONS

U.S. Appl. No. 61/665,099, filed Jun. 27, 2012, "Aluminized Diatomaceous Earth Water Purification Device".

Blackford, D.B. et al., Alteration in the Performance of Electrostatic Filters Caused by Exposure to Aerosols, 4th World Filtration Congress, 7.27-7.33.

Brown, R.C. et al., Effect of Industrial Aerosols on the Performance of Electrically Charged Filter Material, Hyg. vol. 32 (3): 271-94, 1988.

Henderson, D.W. et al., An Appartus for the Study of Airborne Infection, J. Hyg. Camb. vol. 50, p. 53-67, 1952.

Johnson, P.R., Whadaya Mean?, Filtration News vol. 20(5): 10-11, 2002.

Mandaro, Charge Modified Depth Filters: Cationic-Charge Modified Nylon Membranes, in Filtration in the Pharmaceutical Industry, T.H. Meltzer Ed., Marcel Dekker, Inc., NY, 1987.

Martin, S.M. et al., Electrostatic Respirator Filter Media: Filter Efficiency and Most Penetrating Particle Size Effects, Appl. Occ. & Envir. Hygiene vol. 15(8): 609-17, 2000.

(56) References Cited

OTHER PUBLICATIONS

Moyer, E.S. et al., Electrostatic N-95 Respirator Filter Media Efficiency Degradation Resulting from Intermittent NaCl Aerosol Expos., Appl. Occ. & Envir. Hyg. 15(8): 600-8.
Raynor, P.C. et al., The Long-Term Performance of Electrically Charged Filters in a Ventilation System, J. of Occ. and Envir. Hygiene, vol. 1(7): 463-471, Jul. 2004.
Wilkie, A.E. et al., Multi-Component Fiber Technology for Medical and Other Filtration Applications, 1st Inter. Conf. on Med. Filtration, DE Oct. 9, 2002.
Willkommen, H., Virus Validation of Filtration Procedures, PDA/FDA Viral Clearance Forum, Bethesda, MD, Oct. 2001.
Yavorovsky, N.A. et al., (2000), Ultra-fine powder by wire explosion method, Acta Materialia 44(8/9): 2247-2251.
Ahuja, S., Handbook of Bioseparations, Academic Press, 2000, TOC.
Dicosmo et al., Cell Immobilization by Adsorption to Glass Fibre Mats, I.A. Veliky et al., Ed., Blackie Academic & Professional, 1994.
Farrah, S.R. et al., Concentration of Viruses from Water by Using Cellulose Filters Modified by In-Situ Precipitation of Ferric and Aluminum Hydroxides, Appl. Envir. Micro, 1985.
Farrah, S.R. et al., Adsorption of Viruses by Diatomaceous Earth Coated with Metallic Oxides and Metallic Peroxides, Water Sci. Tech. 24(2): 235-40, 1991 (abstract).
Farrah, S. R. et al, Use of Modified Diatomaceous Earth for Removal and Recovery of Virus in Water, Appl. Envir. Micro, Sep. 1991, pp. 2502-2506.
Fulton, George, P., Diatomaceous Earth Filtration for Safe Drinking Water, 2000, Amer. Soc. Civil Engineers Press.
Gitzen, W.H., Alumina as a Ceramic Material, American Ceramic Soc., Special Pub. 4, 1970, 13-14, TOC.
Hou, K. et al., Capture of Latex Beads, Bacteria, Endotoxin and Viruses by Charge-Modified Filters, Appl Envir Micro, Nov. 1980, 892-96.
Katz, J. et al., Mestastable Nanosized Aluminum Powder as Reactant in Energetic Formulations, 1-7.
Khalil, K., Synthesis of Short Fibrous Boehmite Suitable for Thermally Stabilized Transition Aluminas Formation, Journal of Catalysis, 1198 (178):198-206, Abstract.
Knight, R. A., et al., Charge—Modified Filter Media in Filtration and Purification in the Biopharmaceutical Industry, Second Edition edited by Maik J. Jornitz, Theodore H. Meltzer.
Lukasik, J., et al., Adsorption of Microorganisms to Sand and Diatomaceous Earth Particles Coated With Metallic Hydroxides, KONA, No. 14, 87-90, 1996.
Lukasik, J. et al., Influence of Salts on Virus Adsorption to Microporous Filters, Appl. Envir. Micro, 66: 2914-20.
Marcano, D. C, et al., Improved Synthesis of Graphene Oxide, ACS NANO, v. 8, No. 8, p. 4806, 2010.
Meltzer, T.H. et al., Filtration in Biopharmaceutical Industry, Marcel Dekker, NY, 262-265, 1998. 5.
Ostreicher, E.A., Charge Modified Filter Media, Filtration and Purification in the Biopharmaceutical Industry, Drugs and the Pharmaceutical Sciences; 174.
Reife, A., et al., Environmental Chemistry of Dyes and Pigments, John Wiley & Sons, Inc., New York, 1996.
Robinson et al., Depyrogenation by Microporous Membrane Filters, Tech. Rpt. No. 7, Depyrogenation, Parenteral Drug Assn, Phila, PA, 1985, TOC, p. 55-69.
Romanchuk A.Y., et al., Graphene Oxide for Effective Radionuclide Removal, Phys. Chem. Chem. Phys. 2013, 15 (7) p. 2321.
Sinha, D., Pretreatment Process Considerations for the Semiconductor Industry, Ultrapure Water 7(6): 21-30, 1990.
Sobsey, M.D. et al., Poliovirus Concentration of from Tap Water with Electropositive Adsorbent Filters, Appl Enviro Micro, 1980: 201-210.
Tepper, F., Nanosize Powders Produced by Electro-Explosion of Wire and Their Potential Applications, Argonide Corporation, Sanford, FL, Abstract, 2000.
Tepper, F., et al., Non-Woven Electrostatic Media for Chromatographic Separation of Biological Particles, Chrom. & Related Technologies, 32, p. 607-627 2009.
Tien, Chi, Adsorption Calculations and Modeling, 1994 Butterworth-Heinemann (TOC provided).
Wang, L., K., Diatomaceous Earth Precoat Filtration, Chap. 5 in Handbook of Environmental Engineering, V. 4, 2004, Advanced Physicochemical Treatment Processes, Humana Press.
Yavorosvsky, N.A., (1996), Izvestiia VUZ, Fizika 4:114-35 1996(with translation of abstract).

\* cited by examiner

ALUMINIZED SILICIOUS POWDER AND WATER PURIFICATION DEVICE INCORPORATING SAME

CROSS-REFERENCE TO RELATED APPLICATIONS

This application claims the benefit of U.S. Provisional Patent Application Ser. No. 61/665,099, filed on Jun. 27, 2012, incorporated herein by reference.

BACKGROUND

The use of silicious materials such as diatomaceous earth and perlite for water purification are known. Silicious materials work via size exclusion of particles that are larger than the pore sizes of the coating or filter made from the silicious material. Silicious materials are inert, meaning that they cannot be functionalized.

Accordingly, there is a need for a sorption material that can remove contaminants that are smaller than the pore sizes formed in silicious coatings or filters, and that are capable of being functionalized.

SUMMARY

In an embodiment, a reaction product is disclosed. The reaction product is made from a mixture comprised of (a) a silicious powder, (b) an aluminum metal, and (c) an aqueous solution. In embodiments, the silicious powder may comprise diatomaceous earth, perlite, talc, vermiculite, sand, calcine composites, or combinations thereof In embodiments, the aluminum metal may be a powder, flakes, or combinations thereof In embodiments, the aqueous solution may be acidic. In embodiments, the aqueous solution may be alkaline.

In an embodiment, a sorbent comprising the reaction product is disclosed.

In an embodiment, a method of purifying water is disclosed. In an embodiment, the method of purifying comprises forming a liquid suspension by mixing the sorbent with a volume of water, and separating a volume of purified water from the liquid suspension.

In an embodiment, a method of manufacturing a sorbent is disclosed. In an embodiment, the method of manufacturing comprises mixing (i) a silicious powder and (ii) aluminum metal in (iii) an aqueous solution, heating the mixture to a temperature from 60° C. to 80° C. to form a reaction product, and neutralizing the reaction product to a pH from 6.0 to 8.0.

In an embodiment, a device for removing contaminants from a water source is disclosed. The device comprises a sorption chamber structured and arranged to store a sorbent comprising a reaction product formed from a mixture comprising silicious powder, aluminum metal, and an aqueous solution, the sorption chamber further structured and arranged to communicate with the water source and to mix a volume of the water source with the sorbent to form a liquid suspension; and a separation element structured and arranged to receive the liquid suspension from the sorption chamber, and further structured and arranged to separate a volume of purified water from the liquid suspension, wherein the separation element comprises a port structured and arranged to eject at least a portion of the purified water.

BRIEF DESCRIPTION OF THE DRAWINGS

The objects, features and advantages of the disclosed sorbent will be more readily appreciated upon reference to the following disclosure when considered in conjunction with the accompanying drawings.

DETAILED DESCRIPTION

Figure 1:
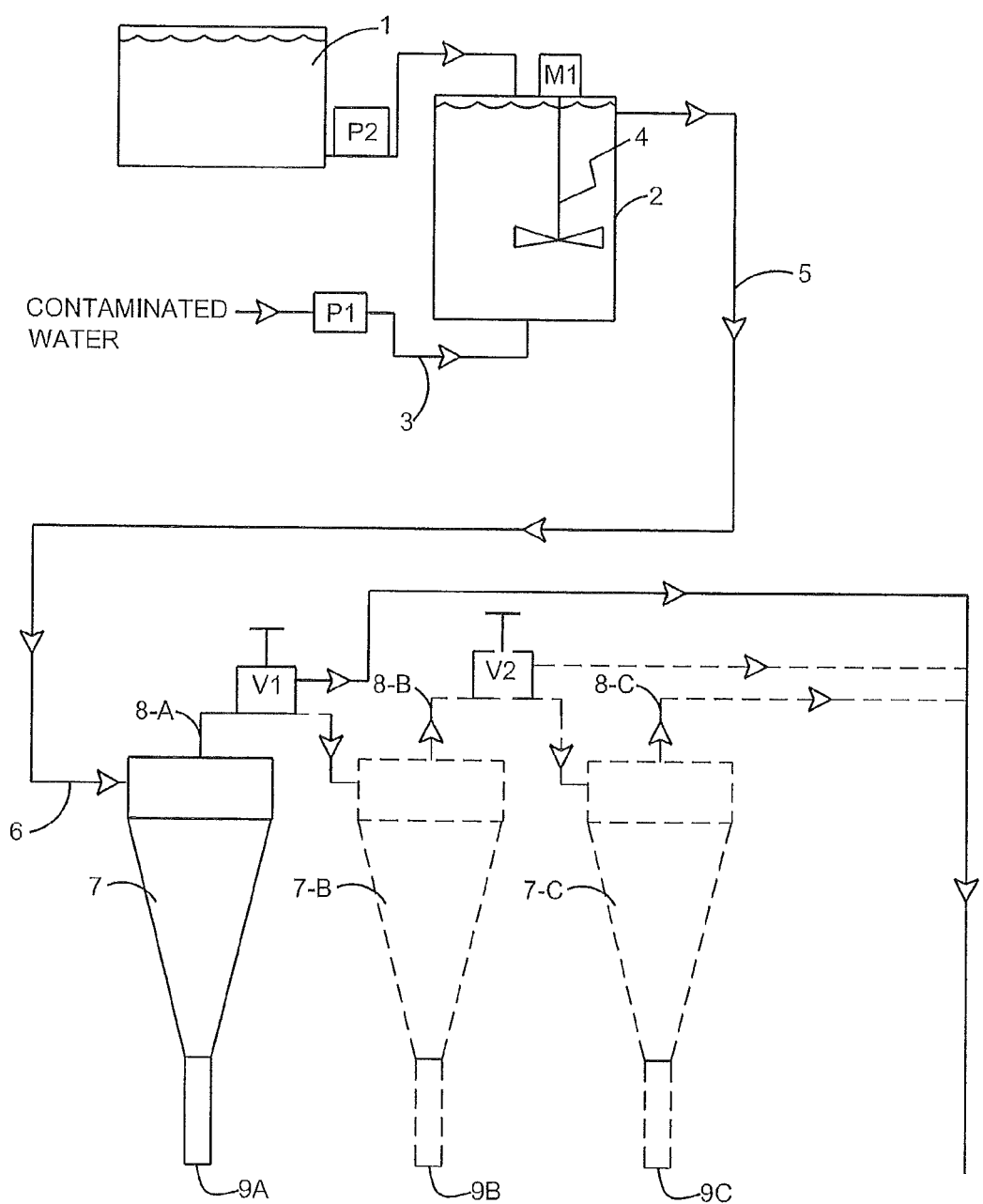
FIG. 1 is a schematic of an embodiment of a device for removing contaminants from a water source.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

In this application, unless specifically indicated to the contrary, when it is stated that a reaction product or a sorbent is "substantially free" of a particular component, it means that the material being discussed is present in the reaction product or the sorbent, if at all, as an incidental impurity. In other words, the material is not intentionally added to the reaction product or the sorbent, but may be present at minor or inconsequential levels, because it was carried over as an impurity as part of an intended component of the reaction product or the sorbent.

As used herein, "natural organic matter" means the natural degradation products of flora.

In an embodiment, a reaction product that is used to form a sorbent for use in water purification is disclosed. In other words, the sorbent is used to remove contaminants from a water source, such as to remove contaminants from municipal drinking or waste water, water sources that have been contaminated by oil refining or oil or gas drilling, water sources that are used in industrial or pharmaceutical settings, or to remove radioisotopes from water sources in nuclear reactors. Thus, non-limiting examples of the water source include, but are not limited to, municipal drinking water, municipal waste water, and water sources in industrial, pharmaceutical, or nuclear plants. Non-limiting examples of the contaminants include, but are not limited to, soluble toxic metals such as lead, lead oxide, soluble dyes, oil such as spill oil and emulsified oil, carcinogens, arsenic, biological materials such as bacteria, virus, natural organic matter, cell debris, or combinations thereof. The contaminants may have any particle size, including a particle size from, including contaminants having a particle size from 0.0003 µm to 3 µm, such as from 0.1 µm to 2 µm, such as from 0.2 µm to 1 µm.

In an embodiment, the reaction product is formed from a mixture comprising a silicious powder, an aluminum metal, and an aqueous solution. In an embodiment, the aluminum metal may react with water in the aqueous solution to form aluminum oxide/hydroxide and hydrogen gas. In an embodiment, the reaction product comprises particles of silicious powder that are at least partially coated by aluminum oxide/hydroxide.

In an embodiment, the silicious powder is comprised of a silicious mineral. In an embodiment, the silicious mineral may be diatomaceous earth, perlite, talc, vermiculite, sand, calcine composites, or combinations thereof. In an embodiment, the silicious material may be comprised of particles having a size from 0.25 µm to 100 µm, such as from 0.5 µm to 80 µm, such as from 5 µm to 50 µm, such as from 10 µm to 25 µm.

In an embodiment, the silicious powder may be present in the mixture in an amount ranging from 60 to 98% by weight based on the total weight of the silicious powder and the aluminum metal. In another embodiment, the silicious powder may be present in the reaction mixture in an amount ranging from 70 to 90% by weight based on the total weight of the silicious powder and the aluminum metal, such as from 80 to 85% by weight based on the total weight of the silicious powder and the aluminum metal.

In an embodiment, the aluminum metal may be a powder, flakes, or combinations thereof. In another embodiment, the aluminum metal is not a salt.

In an embodiment, the aluminum metal may be present in the mixture in an amount ranging from 3 to 40% by weight based on the total weight of the silicious powder and the aluminum metal. In another embodiment, the aluminum metal may be present in the mixture in an amount ranging from 10 to 35% by weight based on the total weight of the silicious powder and the aluminum metal. In another embodiment, the aluminum metal may be present in the mixture in an amount ranging from 15 to 25% by weight based on the total weight of the silicious powder and the aluminum metal.

In an embodiment, the weight ratio of the weight of the silicious powder to the aluminum metal may be from 40:1 to 1.5:1.

In an embodiment, an excess amount of the aqueous solution is added to the mixture relative to the amount of silicious powder and aluminum metal in the mixture. In an embodiment, the aqueous solution may be alkaline and may be, for example, sodium hydroxide, potassium hydroxide, ammonia, ammonium hydroxide, or combinations thereof In an embodiment, the aqueous solution may be added to the mixture in an amount sufficient to yield a mixture having a pH from 9 to 14, such as from 10 to 13, such as from 11 to 12.

In an embodiment, the aqueous solution may be acidic and may be, for example, a mineral acid, nitric acid, sulfuric acid, hydrochloric acid, hydrofluoric acid, or combinations thereof. In an embodiment, the aqueous solution may be added to the mixture in an amount sufficient to yield a mixture having a pH from 0 to 4, such as from 1 to 3.5, such as from 2.5 to 3.5.

In an embodiment, the mixture may further comprise iron, iron oxide, iron hydroxide, graphene, graphene oxide, or combinations thereof.

In an embodiment, the reaction product may comprise a polymer coating that may be modified by a functional group, including as examples, but not limited to, an alcohol, an aromatic ring, an alkane, an aldehyde, a carboxylic acid, an ester, or combinations thereof.

In an embodiment, the reaction product may be used to form a sorbent.

In an embodiment, the method of manufacturing the sorbent comprises the steps of forming a reaction product from a mixture. In an embodiment, the step of forming the reaction product comprises mixing a silicious powder, an aluminum metal, and an acidic or alkaline aqueous solution, as described above. The step of mixing may be carried out at ambient pressure. Following mixing, the mixture is heated to a temperature from 25° C. to 100° C., such as from 50° C. to 90° C., such as from 60° C. to 80° C. to form the reaction product. The pH of the reaction product is then neutralized to a pH from 6 to 8. In embodiments in which the pH of the reaction product is greater than 8, the reaction product may be neutralized to a pH from 6 to 8 using an acid. Suitable acids may be, for example, inorganic acids such hydrochloric acid, nitric acid, or sulfuric acid, or organic acids such as acetic acids, or combinations thereof. In other embodiments in which the pH of the reaction product is less than 6, the reaction product is neutralized to a pH from 6 to 8 using a base. Suitable bases may be, for example, sodium hydroxide, potassium hydroxide, ammonia, or combinations thereof. After the pH is neutralized, the reaction product is then filtered or decanted to separate the solid matter, or sludge, from the fluids.

In an embodiment, the sludge is formed into a slurry that is used as the sorbent.

In an embodiment, the sludge is then dried and pulverized to form a sorbent. In embodiments, the sludge is dried at a temperature from ambient temperature to 100° C., such as from 50 to 80° C. such as from 60 to 75° C. The sludge is then pulverized by application of a mechanical force using any suitable mechanism known to those skilled in the art. In an embodiment, the sludge is dry-milled.

In an embodiment, the mixture further comprises organic or inorganic material such as, for example, iron, iron oxide, iron hydroxide, graphene, graphene oxide, or combinations thereof. In an embodiment, the organic or inorganic material may be added to the mixture prior to mixing the silicious powder and the aluminum metal in the aqueous solution. In another embodiment, the organic or inorganic material may be added to the mixture after mixing the silicious powder and the aluminum metal in the aqueous solution, that is, after the silicious powder is coated with the aluminum metal.

In an embodiment, the formed sorbent may be a slurry that is dispersed in an aqueous solution, a powder, or a cake. In an embodiment, the sorbent may be substantially free of fibers. In an embodiment, the sorbent is not a matte.

In an embodiment, the sorbent has a zeta potential greater than 0, such as +3 mV to +81 mV, such as +25 mV to +60 mV.

In an embodiment, a device for removing contaminants from an aqueous solution is disclosed. The device may have a sorbent comprising the reaction product described above. In an embodiment, a volume of water from a water source is exposed to the sorbent followed by phase separation of the particles from the fluid. In embodiments, phase separation may be accomplished by filtration or the difference in density between spent particles and the purified solution. In an embodiment, the device may be capable of a high capacity and high speed of retention for a wide variety of contaminants. In embodiments, the device may filter microbiological materials such as MS2 virus at several orders of magnitude greater than conventional filtering devices. In embodiments, the device may eliminate the need for precoating that is used in conventional filtration systems using diatomaceous earth. In other embodiments, the device may include a precoat that may be made from the silicious material. In embodiments, the sorbent can be used to filter many contaminants rather than the short term (2-4 days) batch method known in conventional diatomaceous earth precoat processing. In an embodiment, the reactor for forming the sorbent may be joined to the mixing chamber containing the contaminant and the separation device.

In an embodiment illustrated in FIG. 1, the device has a sorbent (1) and a body feed tank (2). The sorbent (1) is made from the reaction product, described above. The sorbent (1) and a feed of contaminated water (3) may be pumped to the body feed tank (2). An agitator having a propeller (4) mixes the sorbent (1) and the stream of contaminated water (3). An effluent (5) is fed into a hydrocyclone (7A) via a tangential feed (6). The sorbent (1) settles at the internal periphery of the hydrocyclone (7A) and accumulates as sludge while purified water is extracted through port (8). In an embodiment, the device has additional hydrocyclones (7B, 7C) that operate in series. In hydrocyclones (7B, 7C), the sludge is extracted through ports 9.

Figure 2:
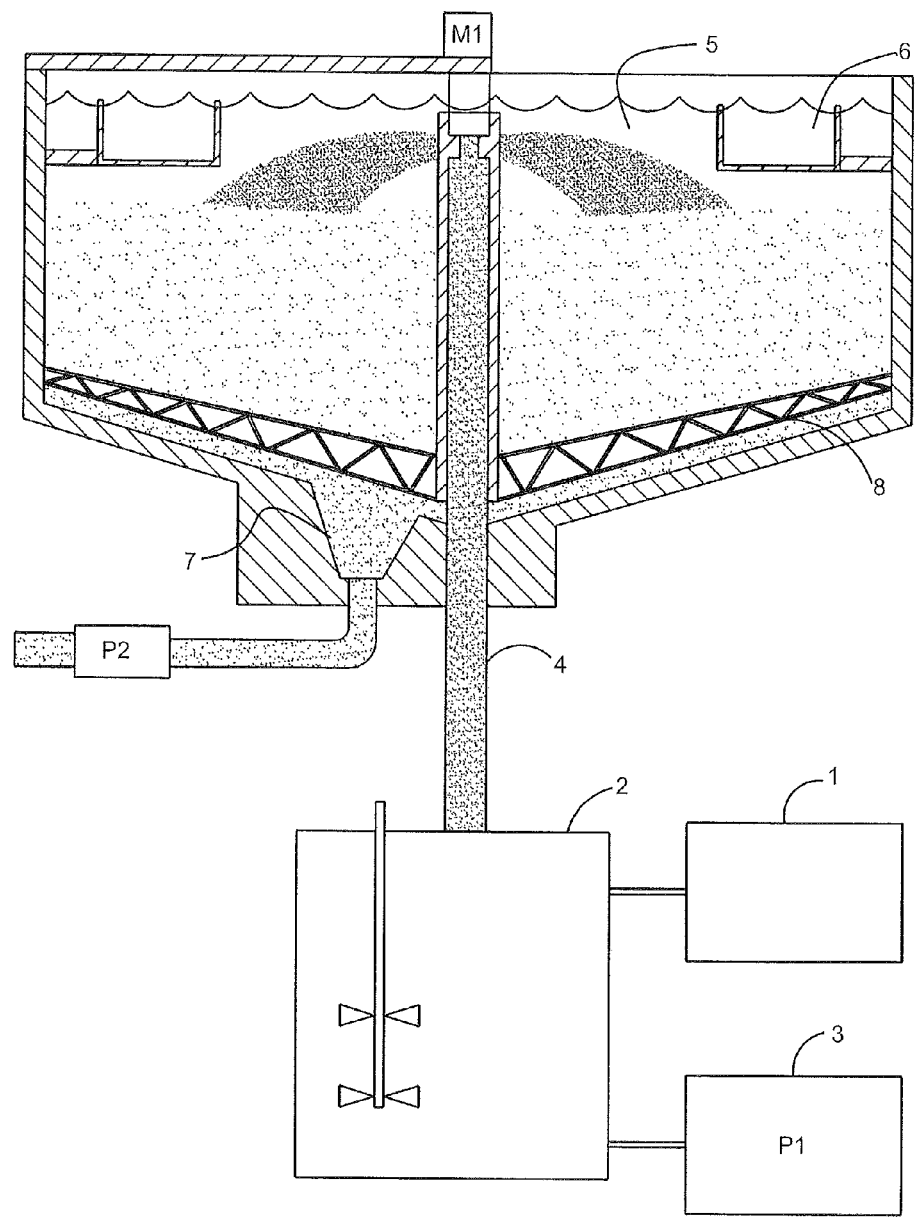
FIG. 2 is a schematic of another embodiment of a device for removing contaminants from a water source.

Another embodiment of a device is schematically illustrated in FIG. 2. The sorbent from tank (1) is added to the reaction chamber (2) as raw water is pumped through pipe (3). Reacted sorbent is pumped up through pipe (4) into a conical settling chamber. The flow velocity of the fluid is slowed considerably as it enters the settling zone (5) allowing the partially spent sorbent to react further while settling. Clean water flows out though decanting trough (6). After significant accumulation of sorbent in the base of the unit, it may be washed out as sludge (7) or scraped out with a solids scraper arm (8).

In an embodiment, a method of purifying water is disclosed. In an embodiment, the sorbent is mixed with a volume of an aqueous solution to form a liquid suspension and a volume of purified water is separated from the liquid suspension. The step of separating may be accomplished by a cyclone, gravity, a centrifuge, a filter, or combinations thereof.

Illustrating the invention are the following examples that are not to be considered as limiting the invention to their details. All parts and percentages in the examples, as well as throughout the specification, are by weight unless otherwise indicated.

EXAMPLES

As used throughout these Examples, "DE" refers to diatomaceous earth powder.

As used throughout these Examples, "PE" refers to perlite powder.

As used throughout these Examples, "DEAL" refers to the reaction product comprising diatomaceous earth coated with aluminum metal as described in Example 1A and 1B, below.

As used throughout these Examples, "PEAL" refers to the reaction product comprising perlite coated with aluminum metal as described in Example 1A and 1B, below.

Example 1A

Coating of Silicious Powder with Aluminum Metal in an Alkaline Solution

As shown in Table 1, silicious powder, in the form of diatomaceous earth or perlite (140 g to 1,400 g) were dispersed in 4 liter of RO water and were reacted in an 8 L stainless steel pot with 17.5 g to 175 g, respectively, of micron size aluminum powders (available from Atlantic Equipment Engineers) in the presence of 40 mL of 10 MNaOH at ambient pressure. The suspension was heated to its boiling point at ambient pressure while mixing with an air-driven mixer equipped with 5 cm diameter impeller at 300 RPM. The suspension was cooled to 40-50° C., neutralized with 10% sulfuric acid to pH 6-8, decanted, dried overnight at 100° C., crushed and sieved using a mechanical shaker through a 170 mesh sieve.

Example 1B

Coating of Silicious Powder with Aluminum Metal in an Acidic Solution

As shown in Table 1, silicious powder, in the form of diatomaceous earth or perlite (140 g), were dispersed in 0.4 liter of RO water and were reacted in an 8 L stainless steel pot with 17.5 g of micron size aluminum powders (available from Atlantic Equipment Engineers) in the presence of 30 mL of 95-98% sulfuric acid and 15 mL of 70% nitric acid at ambient pressure. The suspension was heated to its boiling point at ambient pressure while mixing with an air-driven mixer equipped with 5 cm diameter impeller at 300 RPM. The suspension was cooled to 40-50° C., neutralized with 1 MNaOH to pH 6-8, decanted, dried overnight at 100° C., crushed and sieved using a mechanical shaker through a 170 mesh sieve.

TABLE 1

| | | Composition and properties of DEAL and PEAL powders | | | | |
|---|---|---|---|---|---|---|
| DE or PE powders | Grades | Manufacturer | Treatment | Medium particle size, μm | Wt % aluminum solids | Name |
| DE | Hyflo Super-Cel | Manville Filtration and | Flux-calcined | 18 | 5, 10, 20, 50 | DEAL |
| | MN23 | EP Minerals | Natural | 5 | 20 | DEAL-5 |
| | MN2 | EP Minerals | Natural | 15 | 20 | DEAL-15 |

TABLE 1-continued

Composition and properties of DEAL and PEAL powders

| DE or PE powders | Grades | Manufacturer | Treatment | Medium particle size, μm | Wt % aluminum solids | Name |
|---|---|---|---|---|---|---|
| PE | Ultraperlite-44 | American Stone Pioneers | Natural | 25 | 20 | PEAL-44 |
|  | Perlite-27 | American Stone Pioneers | Natural | 25 | 20 | PEAL-27 |

Examples 2-17 use DEAL formed as described in Example 1A.

Example 2

Calculation of DEAL's Zeta Potential

The streaming potential of the DEAL was measured by means of a pair of Ag/AgCl electrodes located on both parts of a filter column (18 mm diameter and 30 mm long) filled with DEAL powder. As is known by those skilled in the art, the apparent zeta potential ($\zeta$) is a function of bulk conductivity of filtered liquid ($\lambda_b$) while the true zeta potential ($\zeta_{true}$) is a function of bulk conductivity of filtered liquid ($\lambda_b$) as well as surface conductance effect due to the powdered material ($\lambda_s$).

Figure 3:
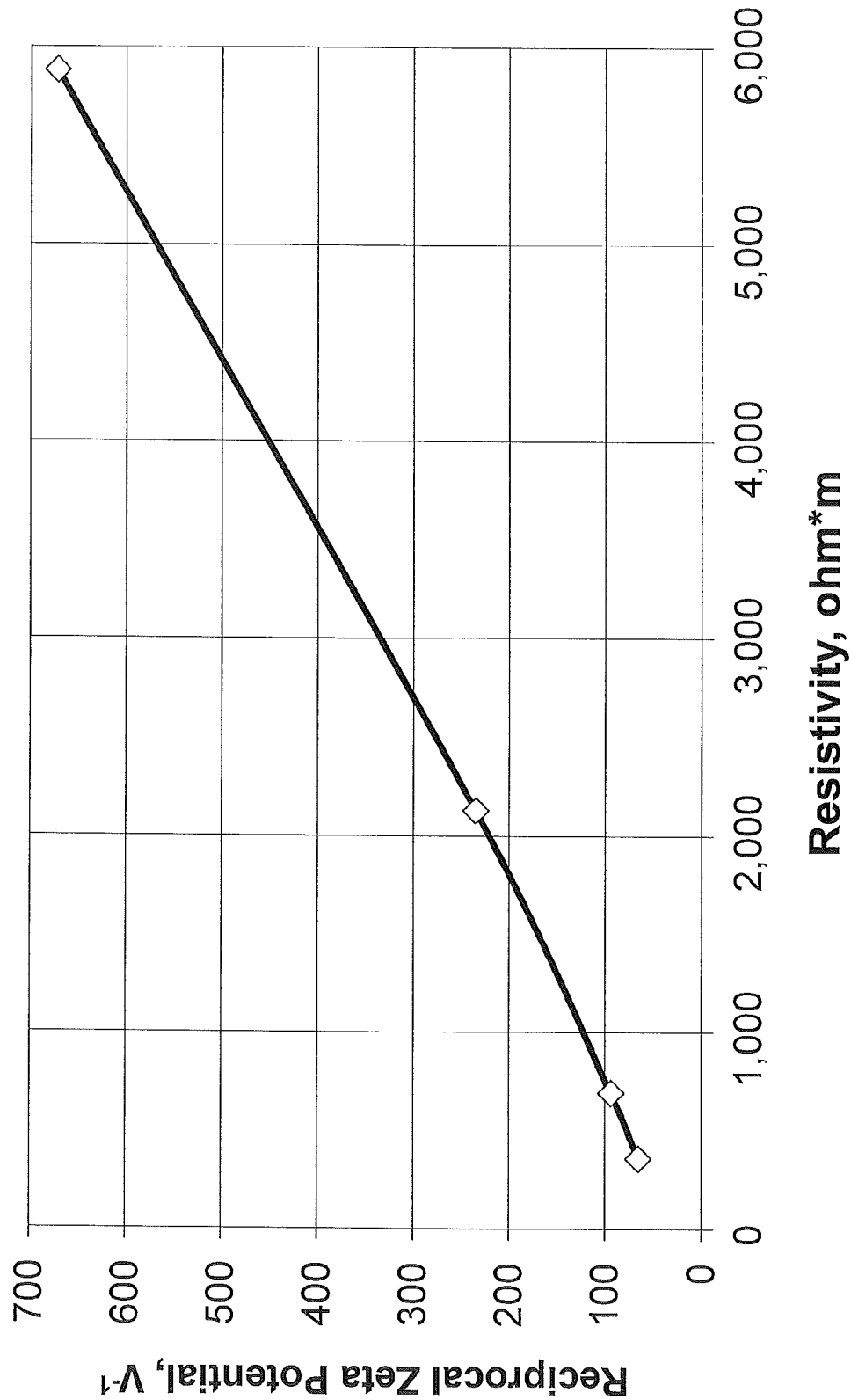
FIG. 3 graphically depicts the reciprocal zeta potential of an embodiment of the sorbent as a function of the resistivity of the filtered water.

As shown in FIG. 3, the true zeta potential and specific surface conductance were calculated by plotting the reciprocal of the apparent zeta potential as a function of resistivity of the water. As shown in FIG. 3, the true zeta potential of DEAL-5 was 61 +10 mV.

Figure 4:
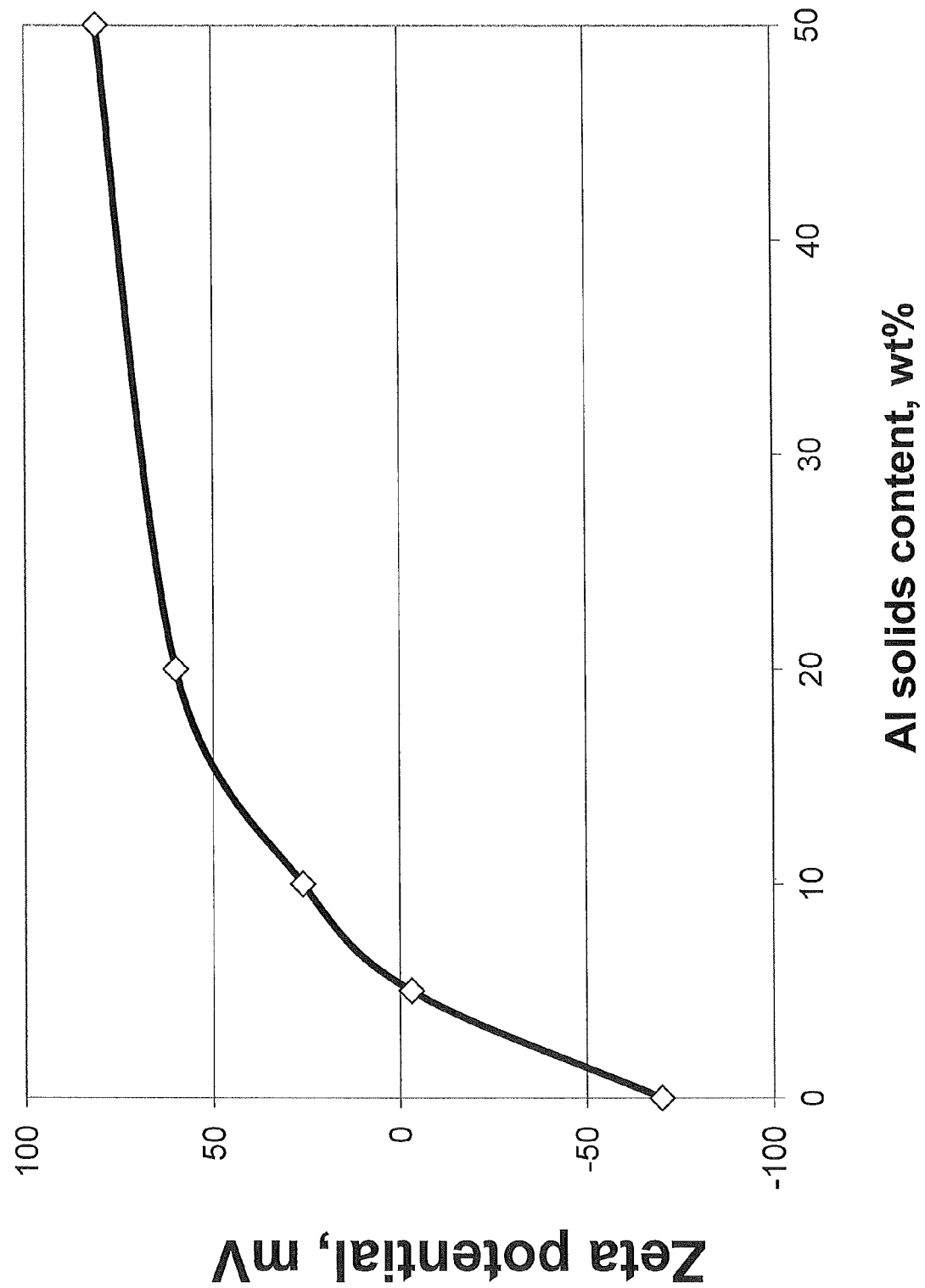
FIG. 4 illustrates the zeta potential of DEAL powder as a function of the loading of aluminum solids.

FIG. 4 illustrates the zeta potential of DEAL powder as a function of the loading of aluminum metal as a solid.

As illustrated in FIGS. 3 and 4, DEAL is electropositive, with a true zeta potential of greater than +50 mV at aluminum oxide/hydroxide solids loading greater than ~20%.

Examples 3-9

Removal of Contaminants With or Without Precoat

The Buchner funnel is a laboratory device known to those skilled in the art that may be used to test efficiencies of filtering aid powders or slurries.

In Examples 3-9, the Buchner funnel test was modified to form a precoat (DE, DEAL, PE, or PEAL) to simulate the filter septum. The removal efficiency of various contaminants were compared between samples exposed to either: DE body fluid; DE precoat+DE body fluid; DEAL body fluid; DEAL precoat+DEAL body fluid; PE body fluid; PE precoat+PE body fluid; PEAL body fluid; or PEAL precoat+PEAL body fluid.

Example 3A

Formation of Precoat

The precoats were formed by using Nalgene Filter holders with receiver (available from Cole-Palmer, Cat #S-06730-53). The upper chamber capacity was 500 mL and the receiver capacity was 1 L. Five layers of 47 mm diameter woven wire screen with an average pore size of 200 μm were used as a support to form the precoat. A vacuum pump was used to reduce pressure in the receiver chamber to provide a differential pressure with respect to the upper chamber that was held at the ambient atmospheric pressure. The test was conducted in batches. Each individual batch was 1 L volume. Four grams of either DE, PE, DEAL, or PEAL powders were manually mixed in 1 L of reverse osmosis water to form powder suspensions at concentrations of 4 g/L. 500 mL of the powder suspension of either DE, PE, DEAL, or PEAL was poured into the upper chamber and the suction valve was opened on the vacuum pump to control the flow rate. After filtering 650 mL of slurry, the suction valve on the vacuum pump was closed and flow was terminated. Each precoat was 12 cm² and 3 mm thick.

Example 3B

Formation of Body Fluid

After the precoat was formed, the lower reservoir was emptied and flushed several times with reverse osmosis water or distilled water to reduce turbidity to below a detection limit of 0.05 NTU. A known amount of a contaminant (described below in each of Examples 3-9) was added to the remaining 350 mL of the powder suspension and was filtered through the precoat. The flow of the body fluid was initiated by opening the suction valve. After 350 mL of contaminant seeded water was filtered at a flow rate of 10-30 mL/min through the precoat layer, the effluent was analyzed for the residuals.

Example 3

Bacteria Retention

Table 2 illustrates the removal efficiency of *E. coli* bacteria using a body fluid water at various contact times with or without a precoat. As illustrated in Table 2, at 30 minutes of contact time, a DEAL precoat+DEAL body fluid had a removal efficiency of >8.4 LRV compared to a removal efficiency of 0.3 LRV using a DE precoat+DE body fluid.

TABLE 2

Removal efficiencies of *E. coli* bacteria (ATCC 15597) by DEAL and DE

| Powder | Mode of filtration | Contact time, min | Influent concentration, CFU/mL | Effluent concentration, CFU/mL | Removal efficiency, LRV |
|---|---|---|---|---|---|
| DEAL | Precoat + body fluid | 30 | $7.2 \cdot 10^6$ | <0.9 | >8.4 |
|  | Precoat | 30 | $2.0 \cdot 10^{10}$ | $1.4 \cdot 10^6$ | 4.2 |

TABLE 2-continued

Removal efficiencies of *E. coli* bacteria (ATCC 15597) by DEAL and DE

| Powder | Mode of filtration | Contact time, min | Influent concentration, CFU/mL | Effluent concentration, CFU/mL | Removal efficiency, LRV |
|---|---|---|---|---|---|
| | Body fluid | 1 | $7.0 \cdot 10^7$ | $7.2 \cdot 10^6$ | 1.0 |
| | | 3 | | $1.2 \cdot 10^7$ | 0.8 |
| | | 10 | | $4.0 \cdot 10^6$ | 1.2 |
| | | 40 | | $5.0 \cdot 10^6$ | 1.1 |
| DE | Precoat + body fluid | 30 | $2.1 \cdot 10^7$ | $9.6 \cdot 10^6$ | 0.3 |

Example 4

Virus Retention

Table 3 illustrates the removal efficiency of virus using a body fluid water at various contact times with or without a precoat. As illustrated in Table 3, at at least 30 minutes of contact time, the removal efficiency of MS2 bacteriophage was at least 16 LRV when using a DEAL precoat+DEAL body fluid. Specifically, the MS2 bacteriophage removal efficiency of the DEAL precoat was 9 LRV at 30 minutes of contact time and the removal efficiency of the DEAL body fluid was 7.3 LRV at an input concentration of $1.3 \cdot 10^{10}$ PFU/mL and a contact time of 40 minutes. The precoat surface area was greater than 10 cm² in order to avoid premature clogging of the device.

Similarly, when using the DEAL body fluid, the removal efficiency of fr bacteriophage was at least 4.3 LRV at an input concentration of $1.1 \cdot 10^5$ PFU/mL and a contact time of 10 minutes.

When using the PEAL-44 precoat+PEAL-44 body fluid, the removal efficiency of MS2 bacteriophage was of 3.6 LRV at an input concentration of $5.0 \cdot 10^9$ PFU/mL and a contact time of 10 minutes. When using the PEAL-27 precoat+PEAL-27 body fluid, the removal efficiency of MS2 bacteriophage was 2.8 LRV at an input concentration of $4.2 \cdot 10^8$ PFU/mL and a contact time of 30 minutes.

When using the DE precoat+DE body fluid, the removal efficiency of MS2 bacteriophage was 0.3 LRV.

Thus, these data illustrate that DEAL, whether used as a precoat, a body fluid, or as a precoat+body fluid, was more efficient than the DE precoat+DE body fluid or the PEAL precoat+PEAL body fluid.

Virtually all bacteria and viruses (including *E coli* and MS2) are electronegative at neutral pH. Virus fr is electropositive at neutral pH since it has isoelectric point (pI) at pH 9.0. While not wishing to be bound by theory, it is thought that the DEAL disclosed herein has an electropositive surface. Therefore, it was an unexpected and surprising result that DEAL was able to remove an electropositive particle such as the fr bacteriophage. These data suggest that DEAL functions by a different mechanism than electropositive modified media/sorbents known in the art.

TABLE 3

Removal efficiencies of MS2[a] and fr[b] bacteriophages by DEAL and DE at pH

| Powder | Mode of filtration | Bacteriophage | Contact time, min | Influent concentration, CFU/mL | Effluent concentration, CFU/mL | Removal efficiency, LRV |
|---|---|---|---|---|---|---|
| DEAL | Precoat + Body fluid | MS2 | 30 | $1.0 \cdot 10^8$ | <0.9 | >8.0 |
| | Precoat | | 30 | $1.3 \cdot 10^{10}$ | 22 | 9.0 |
| | Body fluid | | 1 | $1.0 \cdot 10^8$ | 22 | 6.7 |
| | | | 3 | | 20 | 6.7 |
| | | | 10 | | 15 | 6.8 |
| | | | 40 | | 5 | 7.3 |
| | Body fluid | fr | 5 | $1.1 \cdot 10^5$ | 11 | 4.0 |
| | | | 10 | | 5.5 | 4.3 |
| PEAL-44 | Precoat + Body fluid | MS2 | 10 | $5.0 \cdot 10^9$ | $1.4 \cdot 10^6$ | 3.6 |
| PEAL-27 | Precoat + Body fluid | MS2 | 30 | $4.2 \cdot 10^8$ | $7 \cdot 10^5$ | 2.8 |
| DE | Precoat + Body fluid | MS2 | 30 | $2.1 \cdot 10^7$ | $9.6 \cdot 10^6$ | 0.3 |

Notes:
[a]ATCC 15597-B1;
[b]ATCC 15767-B1

Example 5

Turbidity Removal (Humic Acid)

DEAL has also been found to be highly efficient in the retention of natural organic matter ("NOM") such as humic acid and other tannins, which are precursors in the formation of disinfection by-products, many of which are known to be carcinogenic. Methods of removing tannins from water sources in order to prevent membrane fouling have long been sought.

In this example, humic acid was added to the water source as the contaminant. As illustrated in Table 4, when using the DEAL precoat+DEAL body fluid, the removal efficiency of humic acid was 97% and the capacity was 8.4, while the removal efficiency when using the DE precoat+DE body fluid was only 11% and the capacity was 0.14.

TABLE 4

Humic acid reduction by DEAL and DE

| Sorbent | Input TOC, ppm | Input turbidity, NTU | Output TOC, ppm | Output turbidity, NTU | Contact time, minutes | Removal efficiency, % | Capacity, mg(TOC)/g sorbent |
|---|---|---|---|---|---|---|---|
| DEAL | 10 | 12 | 0.3 | 0.3 | 30 | 97 | 8.4 |
|  | 28.5 | 30 | 0.5 | 0.55 | 60 | 98 | 11.1 |
| DE | 10 | 11 | 8.0 | 8.9 | 30 | 11 | 0.14 |

Example 6

Turbidity Removal (Arizona Test Dust)

Arizona Test Dust, which is made mostly of silica, is an ultrafine test that has an average particle size of 1 µm on a volume basis and a high amount of sub-micron particles on a volume basis.

As illustrated in Table 5, DEAL precoat had a removal efficiency of 96% for Arizona Test Dust.

TABLE 5

Turbidity reduction by DEAL (Ultrafine Arizona dust[a], 0-3 µm)

| Sorbent | Input, ppm | Input turbidity, NTU | Output, Ppm | Output turbidity, NTU | Contact time, minutes | Turbidity removal efficiency, % | Capacity, mg(dust)/g sorbent |
|---|---|---|---|---|---|---|---|
| DEAL | 100 | 120 | 5.6 | 4.9 | 45 | 96 | 11 |

Note:
[a]Available from Powder Technology Inc. (PTI)

Example 7

Oil Separation

Motor oil (10W40) was added to 500 mL of DEAL body fluid at a DEAL concentration of 4 g/L and occasionally manually mixed for 20 minutes. After 20 minutes of dwelling time the motor oil caused coagulated masses that floated on the surface of the water and were easily removable by either decanting or by skimming (scooping) from the water surface. The oil was filtered through a DEAL precoat formed with 2 g of DEAL (i.e., depositing 0.5 L at a concentration of 4 g/L onto five layers of 47 mm diameter woven wire screen whose average pore size was 200 µm).

The thickness of the resulting oil sheen floating on a surface of 500 mL filtered water collected in 1 L polypropylene beaker (Available from VWR, cat. #25384-160) was determined by visually calibrating these sheens versus a known amount of dispersed 10W40 oil (i.e., 2 µL, 4 µL, 6 µL, 8 µL, and 10 µL) into several beakers filled with 500 mL of RO water. It was assumed that the density of 10W40 oil was ~0.8 g/cm$^3$.

As illustrated in Table 6, the removal efficiency of oil by DEAL in conventional DE process was >99.99% and DEAL had a sorption capacity for oil of 2.5 at a contact time of 40 minutes and of 10 at a contact time of 120 minutes.

Several phase separation methods may be used to remove oil from water, including decantation of the floating DEAL/oil mixture and extraction of the cleansed water from the bottom of a body fluid reactor once the stirrer is at rest as well as skimming

TABLE 6

Motor oil (10W40) removal by 4 g of DEAL

| Amount of oil, g | Contact time, min | Oil remaining, g | Removal efficiency, % | Capacity, g oil/g DEAL |
|---|---|---|---|---|
| 10 | 40 | <0.005 | >99.95 | 2.5 |
| 20 | 40 | <0.005 | >99.97 | 5.0 |

TABLE 6-continued

Motor oil (10W40) removal by 4 g of DEAL

| Amount of oil, g | Contact time, min | Oil remaining, g | Removal efficiency, % | Capacity, g oil/g DEAL |
|---|---|---|---|---|
| 30 | 60 | <0.005 | >99.98 | 7.5 |
| 40 | 120 | <0.005 | >99.99 | 10.0 |

Example 8

Adsorption of Dyes

Adsorption is known to be an effective method for removing dissolved organic matter from waste streams.

In this example, residual concentrations of dye in 100 mL filtered aliquots were measured at 25° C. with the use of Genesis 10 UV spectrophotometer at a wavelength of 674 nm. Sorption capacity at a given input dye concentration was estimated from the breakthrough curve, based on the assumption that the breakthrough curve was symmetric with respect to a 50% adsorption point on the curve.

Table 7 presents results of dissolved organic (metanil yellow) reduction by DEAL at pH 8.2. The data shown in Table 7 indicate that DEAL had a sorption capacity from 70 to 225 for metanil yellow at a pH of 8.2 compared to the sorption capacity of the non-woven media disclosed in U.S. Pat. No. 6,838,005, which had a sorption capacity of 5.

TABLE 7

Dissolved Organic (Metanil Yellow) Reduction by DEAL versus Non-Woven Media Disclosed in U.S Pat. No. 6,838,005

| Sorbent | Input, ppm | Capacity, mg(dye)/g sorbent |
|---|---|---|
| DEAL | 400 | 70 |
|  | 700 | 140 |
|  | 1000 | 225 |
| Non Woven Media disclosed in U.S. Pat. No. 6,838,005 | 2.5 | 5 |

Example 9

Method of Operation Without Precoat

In this example, MS2 viruses were removed from the body fluid to greater than 6 LRV (see Table 3) in one minute and with manual shaking of the DEAL, virus mixture. No precoat step was used. The virus level is regarded as safe for drinking water.

Example 10

Soluble Lead Reduction

As shown in Table 8, the DEAL composite adsorbed soluble lead from DI RO water (i.e., body fluid) at pH 6.5 at an efficiency of 61% and 77% for an input of 150 ppb and 350 ppb, respectively.

TABLE 8

Soluble lead reduction by DEAL at pH 6.5

| Input, ppb | Output, ppb | Removal efficiency, % |
|---|---|---|
| 150 | 59 | 61 |
| 350 | 80 | 77 |

Example 11

Virus Retention From High Salinity Water

Table 9 shows results of virus retention by DEAL-5 at high salinity and pH 7 and 8.5 from body fluid at contact time of 1 minute. As illustrated DEAL-5 removed MS2 bacteriophage from a solution having a high salinity at an efficiency from 2.8 to 4.9.

TABLE 9

Removal efficiencies[a] of MS2 bacteriophage by DEAL-5 at pH 7.0 and 8.5 and high salinity

| Challenge water (body fluid) | | Removal efficiency[c], LRV |
|---|---|---|
| pH | TDS[b], g/L |  |
| 7 | 0 | 3.4 ± 0.5 |
| 8.5 | 0 | 3.1 ± 0.5 |
| 7 | 30 | 2.8 ± 0.5 |

TABLE 9-continued

Removal efficiencies[a] of MS2 bacteriophage by DEAL-5 at pH 7.0 and 8.5 and high salinity

| Challenge water (body fluid) | | Removal efficiency[c], LRV |
|---|---|---|
| pH | TDS[b], g/L |  |
| 8.5 | 30 | 3.2 ± 0.5 |
| 7 | 200 | 4.9 ± 0.5 |
| 8.5 | 200 | 4.2 ± 0.5 |

Notes:
[a]contact time 1 min;
[b]adjusted with NaCl;
[c]at input concentration of $2.2 \cdot 10^8$ PFU/mL

Examples 12-14

Examples 12 to 14 describe DEAL powders that have functionalized surfaces.

Example 12

Figure 5:
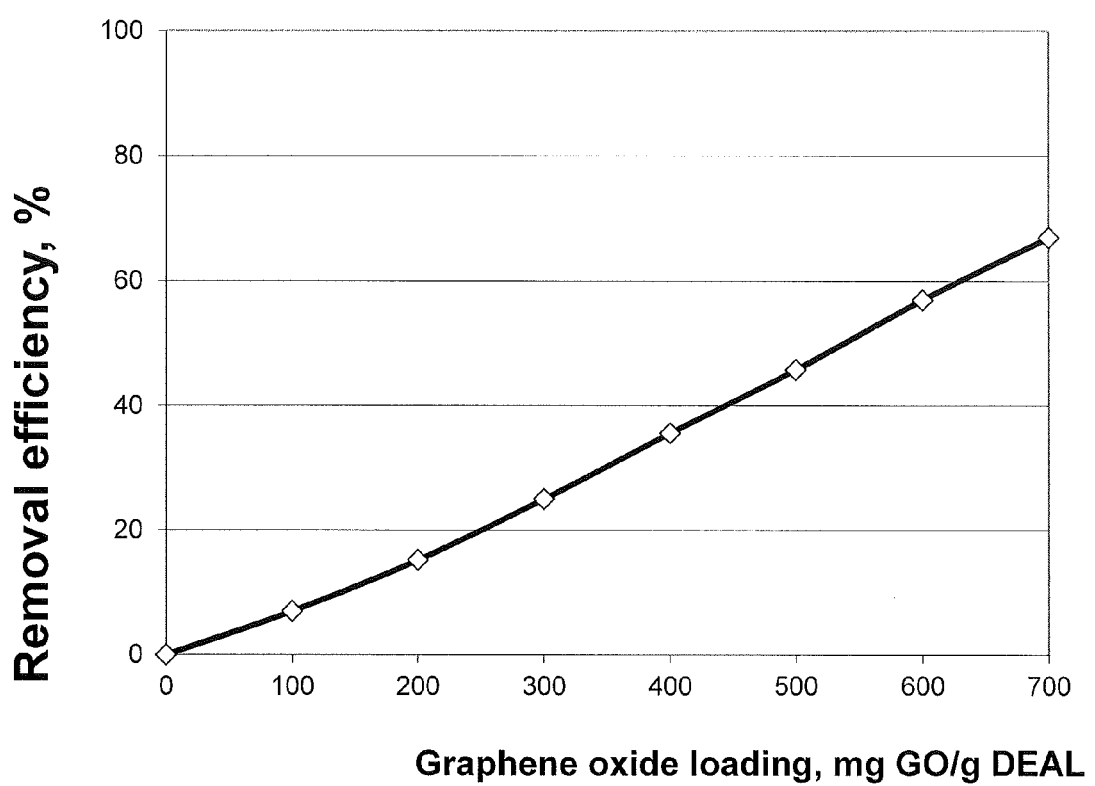
FIG. 5 graphically depicts the removal efficiency of an embodiment of the sorbent functionalized with graphene oxide.

Incorporating Graphene Oxide (GO) Onto DEAL Powders 375 mg of GO nanopowders (a single- or few-layer structure having sheets of $sp^2$ hybridized carbon atoms) were dispersed in 15 mL of RO water. The GO was obtained from Rice University. Seven samples of 100 mg of DEAL powders were dispersed in 3 mL RO water in a 15 ml centrifuge tubes. Aliquots of GO suspension in quantities of 0.5, 1.0, 1.5, 2.0, 2.5, 3.0, and 3.5 mL were added to the DEAL sample tubes and were further filled with RO water to make an equal volume of 6.5 mL in each tube. Following a contact time of 1 minute on an orbiter shaker (Vortex Genie 2), the tubes were centrifuged at 1300 g for 10 seconds to cause the DEAL particles with adsorbed GO particles to settle. The supernatant was analyzed with the use of a Genesis 10 UV spectrophotometer at wavelength of 600 nm. The data are illustrated in FIG. 5.

In order to compare the capacity of the GO-DEAL with that of a known non-woven media, 1 mL of the GO suspension was diluted in 24 mL of RO water (i.e., a 1/25 dilution). The diluted GO suspension was passed through a non-woven media prepared in accordance with U.S. Pat. No. 6,838,005. After passing approximately 10 mL through a 25 mm disc at flow rate 1 GPM/ft$^2$, the pressure drop through the media increased to 60 psi and filtration was stopped. The effluent was clear with turbidity less than 0.01 NTU. The data are shown in Table 10 and indicate that DEAL has 5.4 times greater sorption capacity for GO as compared to the non-woven media prepared in accordance with U.S. Pat. No. 6,838,005.

TABLE 10

Graphene Oxide Removal Efficiency

| Sorbent | Input, ppm | Capacity, mg GO/g sorbent |
|---|---|---|
| DEAL | 11,500 | 543 |
| Non Woven Media (U.S. Pat. No. 6,838,005) | 1,000 | 100 |

Example 13

Coating of DEAL With FeOOH

After cooling the DEAL suspension prepared in Example 1 to 60° C., an additional 10 mL of 10 M NaOH was added, followed by 90 g of $FeCl_3 6H_2O$ dissolved in 500 mL of RO water while mixing the mixture at 1000 RPM. The suspension was cooled to 40 to 50° C., neutralized with 10% sulfuric acid to pH 6-8, decanted, dried overnight at 100° C., crushed by hand and sieved using a mechanical shaker through a 170 mesh sieve. Data are shown in Table 11.

Example 14

Coating of DEAL-5 With Polymer

DEAL-5 powders as prepared in Example 1 were coated with poly(methyl methacrylate) (PMMA) in the following manner. 7.2 g PMMA was added to 700 mL ethyl acetate. 4 g of palmitic acid was added as a surfactant. 50 g of DEAL-5 powder was added and the ultrasonic power was added for 30 minutes while periodically mixing with a glass rod. 700 mL of water was added into a 3 L glass reservoir. 2 g of sodium lauryl sulfate was added as a surfactant and was mixed at 3000 RPM. The DEAL-5/MMA/ethyl acetate mixture was added to the water/sodium lauryl sulfate mixture while mixing for 10 minutes at 3000 RPM. 500-700 mL of ethyl alcohol was added to the reservoir. The mixture was poured onto filter paper and was dried at a temperature of about 50° C. The dried mixture was crushed in a mortar and was sieved through 170 mesh.

Example 15

Equilibrium Capacity of As III

Granular ferric oxide sorbent (Bayer AG Bayoxide E-33) is currently commercialized as an arsenic sorbent. The E-33 was sieved to a 170 mesh and was compared to the FeOOH coated DEAL-5 powders in order to compare arsenic adsorption.

Equilibrium capacity was measured for different sorbents by adding 9 mg of sorbent to a solution of 1 liter of As III at an input concentration of 480 ppb and pH6.5 and mixing with a magnetic stirrer. Acustrip arsenic indicator tape was used to estimate the total arsenic in the effluent. The indicator tape was capable of detecting from 2 ppb to 160 ppb arsenic. The coarse indicator product has a detection limit from about 5 ppb up to about 500 ppb for undiluted solution. The data are shown in Table 11. As illustrated in Table 11, the 15% FeOOH/85% DEAL and GO powders had higher As III equilibrium capacity than E33 and the arsenic absorption occurred more rapidly.

TABLE 11

Arsenic III removal from DI RO water by 9 mg of sorbent at input concentration of 480 ppb and pH 6.5

| Sorbent | Effluent As III concentration, ppb, After contact time | | | Equilibrium capacity, mg |
|---|---|---|---|---|
| | 10 min | 20 min | 100 min | As III/g sorbent |
| 15% FeOOH/85% DEAL | 150 | 160 | 160 | 36 |
| Graphene Oxide (GO) | 270 | 270 | 160 | 36 |
| DEAL-5 | 450 | 240 | 225 | 28 |
| 30% GO/70% DEAL-5 | 250 | 180 | 200 | 31 |
| Bayoxide E33 | 360 | 210 | 200 | 31 |

Example 16

Arsenic V Removal

Figure 6:
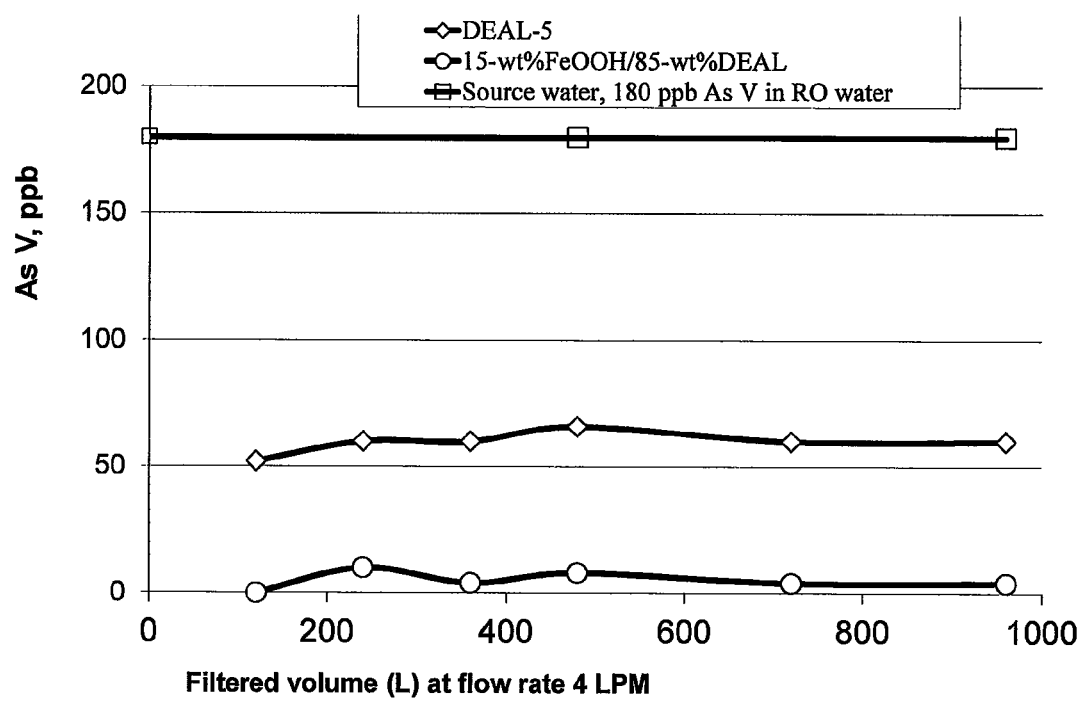
FIG. 6 graphically depicts the removal of arsenic V from RO water by an embodiment of the sorbent.

FIG. 6 shows Arsenic V (As V) removal from RO water at input concentration of 280 ppb and at pH 6.5 in an apparatus with the precoat surface area of 930 $cm^2$ at 4 LPM flow rate.

The data illustrated in FIG. 6 indicate that FeOOH/DEAL powders, prepared as described in Example 13, above, are capable to remove As V to less 10 ppb level at an input concentration of 280 ppb and at pH 6.5.

Example 17

Coagulation of Oil Droplets 20 mL of motor oil (10W40) was used as a contaminant and was added to 1 L of RO at a DEAL concentration of 2 g/L and mixed by air-driven mixer equipped with 5 cm diameter impeller at 3000 RPM 3 minutes. After 2 minutes of dwelling time the oil caused coagulated masses that floated on the surface of the water and were easily removable by either decanting or by skimming (scooping) from the water surface. To determine the efficiency of oil removal the turbidity of the body fluids was measured. Data are shown in Table 12 and demonstrate that DEAL-5 coagulated up to 10 g oil/g DEAL to form a thin sheen layer that floated on the surface of the water.

TABLE 12

Coagulation of oil droplets

| Suspension | Turbidity, NTU after dwelling in a beaker | | |
|---|---|---|---|
| | 2 min | 17 hrs | 94 hrs |
| 20 mL oil/1 L RO | 850 NTU | 300 NTU | 95 NTU |
| 2 g DEAL-5/20 mL oil/1 L RO | 170 NTU | 9.5 NTU | 6.1 NTU |

From the foregoing, it will be observed that numerous variations and modifications can be effected without departing from the spirit and scope of the disclosed sorbent. It is to be understood that no limitation with respect to the specific reaction products, sorbents, methods or device illustrated herein is intended or should be inferred. It is intended to cover by the appended claims all such modifications as fall within the scope of the claims.

We claim:

1. A product consisting of a silicious powder at least partially coated by a coating of aluminum oxide/hydroxide, wherein the coating of aluminum oxide/hydroxide is present in an amount of 20% or greater by weight based on the total weight of the product.

2. The product of claim 1, wherein the coating is electropositive.

3. The product of claim 1, wherein the product has a zeta potential of greater than 50 mV at a pH of 7.

4. The product of claim 1, made by heating a mixture to a temperature of from 25° C. to 100° C., the mixture consisting of (a) the silicious powder, (b) an aluminum metal comprising micron size particles, and (c) an alkaline solution, wherein the aluminum metal reacts with the alkaline solution to form the at least partial coating of aluminum oxide/hydroxide over the silicious powder.

5. The product of claim 4, wherein the silicious powder is present in the mixture in an amount from 60 to 98% by weight based on the weight of (a) plus (b).

6. The product of claim 1, wherein the silicious powder comprises diatomaceous earth, perlite, talc, vermiculite, sand, calcine composites, or combinations thereof.

7. The product of claim 4, wherein the aluminum metal is a powder, flakes, or combinations thereof.

8. The product of claim 4, wherein the aluminum metal is present in the mixture in an amount from 3 to 40% by weight based on the weight of (a) plus (b).

9. The product of claim 4, wherein the weight ratio of the silicious powder to the aluminum metal is from 40:1 to 1.5:1.

10. The product of claim 4, wherein the pH of the mixture is from 9 to 14.

11. The product of claim 4, wherein the aluminum metal reacts with the alkaline solution in the mixture to form the coating of aluminum oxide/hydroxide.

12. The product of claim 4, wherein the particles of aluminum metal have an average particle size of from 3.5 µm to 4.9 µm, as measured by a Fisher sub sieve sizer.

13. A sorbent comprising the product of claim 1.

14. A method of purifying water, the method comprising:
(a) forming a liquid suspension by mixing the sorbent of claim 13 with a volume of water; and
(b) separating a volume of purified water from the liquid suspension.

15. The method of purifying as in claim 14, wherein the separating is accomplished by a cyclone, a sedimentation chamber, a centrifuge, or a filter.

* * * * *